(12) United States Patent
Taillie et al.

(10) Patent No.: US 6,519,361 B1
(45) Date of Patent: Feb. 11, 2003

(54) OPTIMIZATION OF COLOR TRANSFORMATION MATRIX WITH ALL POSITIVE COEFFICIENTS

(75) Inventors: Joseph Paul Taillie, Pittsford, NY (US); David Jon Metcalfe, Marion, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/443,297

(22) Filed: Nov. 19, 1999

(51) Int. Cl.[7] .......................... G06K 9/00; G06K 9/36; G06K 9/40; H04N 1/46; G03F 3/08
(52) U.S. Cl. ..................... 382/162; 382/167; 382/165; 382/170; 382/274; 382/276; 358/515; 358/516; 358/518
(58) Field of Search ................. 382/162, 165, 382/167; 358/515, 518; 348/266

(56) References Cited

U.S. PATENT DOCUMENTS

| 4,541,704 A | * | 9/1985 | Freeman | 358/518 |
| 5,377,025 A | * | 12/1994 | Spaulding et al. | 358/518 |
| 5,668,596 A | * | 9/1997 | Vogel | 348/222 |
| 5,805,213 A | * | 9/1998 | Spaulding et al. | 348/222 |
| 5,850,472 A | * | 12/1998 | Alston et al. | 382/162 |
| 5,987,167 A | * | 11/1999 | Inoue | 382/167 |

* cited by examiner

Primary Examiner—Phuoc Tran
Assistant Examiner—Amir Alavi
(74) Attorney, Agent, or Firm—Oliff & Berridge, PLC

(57) ABSTRACT

A color transformation matrix K transforms device dependent color imaging signals RGB into device independent color imaging signals XYZ. The transformation matrix K includes a set of coefficients $k_n$. An optimization value is calculated for the transformation matrix as a function of the coefficients within the transformation matrix having a value less than zero. The values of the coefficients within the transformation matrix are then adjusted; and a minimal optimization value is determined for the transformation matrix, which preferably has coefficients with values that are greater than zero. The optimization procedure seeks to minimize the optimization value by adjusting the values of the coefficients within the transformation matrix, such that the coefficients within the matrix are all positive values. This added constraint on the transformation matrix in the minimization technique will lead to larger residual color errors. However, in some cases, solutions may be found that minimize the errors without significantly affecting the XYZ values.

18 Claims, 3 Drawing Sheets

OPTIMIZATION OF COLOR TRANSFORMATION MATRIX WITH ALL POSITIVE COEFFICIENTS

BACKGROUND OF THE INVENTION

1. Field of Invention

The invention relates to a technique for the optimization of a color transformation matrix, preferably so that all the coefficients of the transformation matrix have values greater than or equal to zero.

2. Description of Related Art

In most color document scanners, some form of electro-optical imaging system is used to produce a set of color image signals. Often, there are three such signals that can generally be described as red, green and blue, RGB. These signals are "device dependent" because they depend on characteristics of the scanner.

If these signals are related to the human visual system in a certain way, the device dependent signals can be processed to produce a set of signals which are "device independent". That is, the three color image signals produced by the scanner can be expressed by three color scanner coordinates RGB, to which a transformation can be applied to describe the three scanner coordinates in terms of three visual coordinates XYZ. As used herein, these visual coordinates XYZ are tristimulus values or similar coordinates related to tristimulus values. The visual coordinates can be transmitted to an output device such as a printer, copier or display screen to output an image that corresponds to the scanned image. Because the visual coordinates are device independent, they can be transmitted to different copiers, printers or display screens and generally the same image will be output regardless of the characteristics of the scanner, copier, printer or display screen.

The ideal transformation between RGB and XYZ coordinates is a linear matrix operation shown in equations 1–3:

$$X = k_1 * R + k_2 * G + k_3 * B \qquad \text{Eq. 1}$$

$$Y = k_4 * R + k_5 * G + k_6 * B \qquad \text{Eq. 2}$$

$$Z = k_7 * R + k_8 * G - k_9 * B \qquad \text{Eq. 3}$$

A more compact expression is given by the matrix equation $$v = Ks. \qquad \text{Eq. 4}$$

where v and s are column vectors of the visual and scanner coordinates, respectively, and K is a transformation matrix made up of $k_n$ coefficients.

It is common to determine the $k_n$ coefficients by procedures in such a way that the equations are satisfied as close as possible. Optimization schemes have been designed to try to minimize the color errors of scanned inputs by appropriate selection of the coefficients $k_n$ in the transformation matrix K.

SUMMARY OF THE INVENTION

To establish the coefficient matrix K, the scanner scans a document having a set of training colors with known XYZ values. The coefficient matrix K can then be determined such that the equations 1–3 are satisfied as closely as possible. However, this procedure may require one or more of the $k_n$ coefficients to have a negative value. When this occurs, there can be other colors not in the training set which, because of the scanner RGB values that they produce, will result in negative values of X, Y and/or Z. This results to an inconsistency because X, Y and Z are theoretically constrained to positive values. In such a case, the XYZ value will normally be set to zero, thus degrading the quality of the output image and creating inconsistencies between the scanned image and the output image.

Therefore, it is an object of the invention to optimize the coefficient matrix to cause all the coefficients to be positive.

In accordance with the invention, a color transformation matrix is determined for transforming device dependent color imaging signals into device independent color imaging signals. The transformation matrix includes a set of coefficients. The method includes: calculating an optimization value for the transformation matrix as a function of the coefficients within the transformation matrix having a value less than zero; adjusting the values of the coefficients within the transformation matrix; and determining a minimal optimization value for the transformation matrix. Preferably, the transformation matrix will have coefficients with values greater than or equal to zero.

In a preferred embodiment, the optimization value for the transformation matrix is calculated as a function of first and second components, the first component representing a color error between known device independent color signals and calculated approximately device independent color signals that are determined by using the transformation matrix, and the second component representing negative values of the coefficients within the transformation matrix. In a further preferred embodiment, the second component of the optimization value is a term whose size is proportional to the number of negative coefficients, or a term whose size is proportional to the magnitude of the negative coefficients. The first component can be any component that represents color error, including but not limited to mean color error and/or maximum color error.

BRIEF DESCRIPTION OF THE DRAWINGS

Preferred embodiments of the invention will be described with reference to the following drawings in which.

DETAILED DESCRIPTION OF PREFERRED EMBODIMENTS

Figure 1:
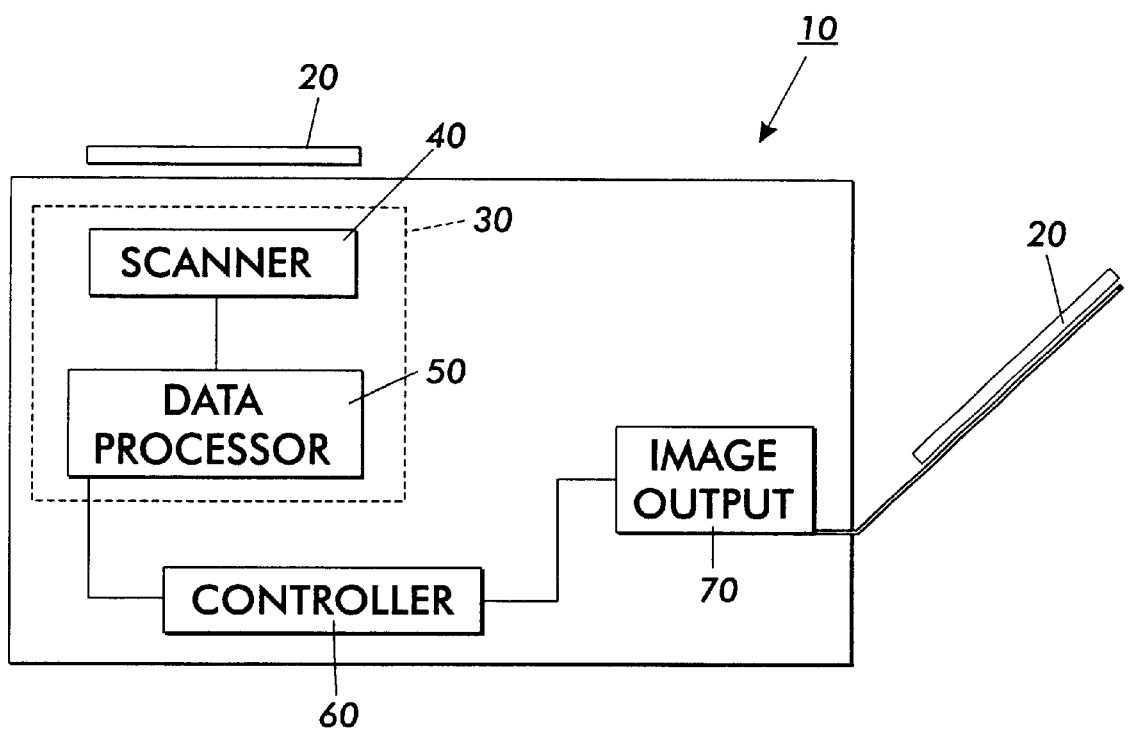
FIG. 1 is a schematic drawing of a color copier in which the invention may be embodied.

FIG. 1 is a highly schematic drawing of a color copier 10 in which the invention may be embodied. The copier 10 is used to image a color document 20 and output a color image on paper or another substrate based on the document image. The copier 10 has an imaging device 30 that includes a scanner 40 and a data processor 50 for sensing the image on the document 20 and outputting signals representing the color image to a controller 60. Based on these signals, the controller 60 controls an image output device 70 to create a color copy 80.

Although the invention is described with reference to a color copier, those skilled in the art recognize that the invention has broader applications to any imaging system. For example, while the imaging device is shown incorporated into a copier, the imaging device could be a stand alone device, such as a hand-held scanner, or incorporated into a larger imaging system such as a scanner, digital camera or personal computer, or an assembly of such devices. Likewise, although the imaging device is shown as including a data processor, the data processing function could be performed by other elements in the controller and/or scanner. Thus, the data processor could be eliminated as a separate component. Further, the data processor and controller can perform any image processing function that can be performed on image data.

Figure 2:
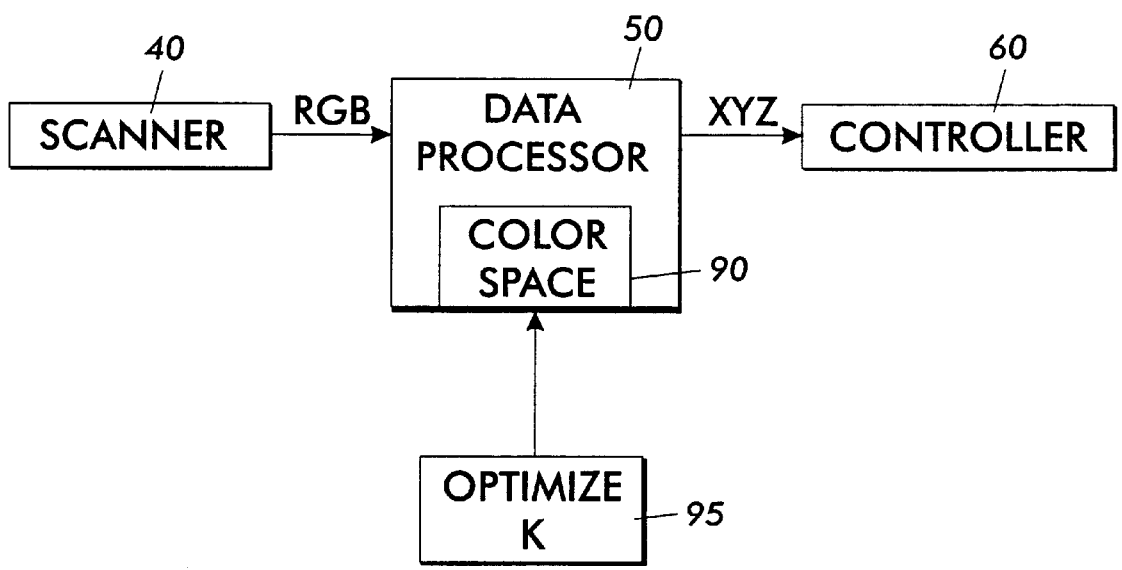
FIG. 2 is a schematic illustration of the operation of an imaging device within the color copier.

FIG. 2 schematically illustrates the operation of the imaging device. An original color document is scanned by the scanner 40, which outputs the scanner RGB values to the data processor 50. A color space transformation module 90, located within the data processor 50, transforms the RGB values using the transformation matrix K to generate the XYZ values, which are input into the controller 60 for operating the image output device 70 to generate the color copy. The module 90 receives the transformation matrix K from an optimization section 95 for optimizing the transformation matrix K.

When initializing the module 90, the scanner scans a document having a set of training colors with known XYZ values. The number of training colors can vary, but the training set of colors may include 236 color patches of known XYZ values. The generated RGB values for the $i^{th}$ color can be evaluated against the known XYZ values for the $i^{th}$ color to calculate the coefficients $k_n$ in the coefficient matrix K. Because the equations 1–3 will not always be exactly true for the scanner, the coefficients $k_n$ are varied in the optimization section 95 to determine a coefficient matrix K that allows the equations 1–3 to be satisfied as closely as possible.

The processes above may result in certain ones of the coefficients $k_n$ having a negative value, which may be helpful in minimizing color differences between the XYZ outputs from the scanned set of training colors and the known set of XYZ values for those training colors. However, when this occurs, the scanner may scan other colors outside of the training set, which because of the scanner RGB values they produce, will result in negative XYZ values. This creates an inconsistency because X, Y and Z are theoretically constrained to positive values. In this instance, the controller 60 sets the negative values to zero, which creates errors between the colors as scanned and the colors as produced.

It is known to use optimization schemes to try to minimize color errors of scanned inputs by appropriate selection of the coefficients $k_n$ in the transformation matrix K. For a given set of coefficients $k_n$, the known optimization schemes calculate an optimization value O as a function of the error between the $i^{th}$ training color as seen visually (i.e., the known XYZ values) and the corresponding color as determined by the scanner (i.e., the calculated XYZ values). The coefficients $k_n$ are then varied and the optimization value O is recalculated in an iterative process to find a set of coefficients $k_n$ that minimizes the optimization value O. The set of coefficients $k_n$ with the minimal optimization value is used as the transformation matrix K. However, the known optimization schemes do not account for negative values of the coefficients $k_n$ which could result in negative XYZ values.

Figure 3:
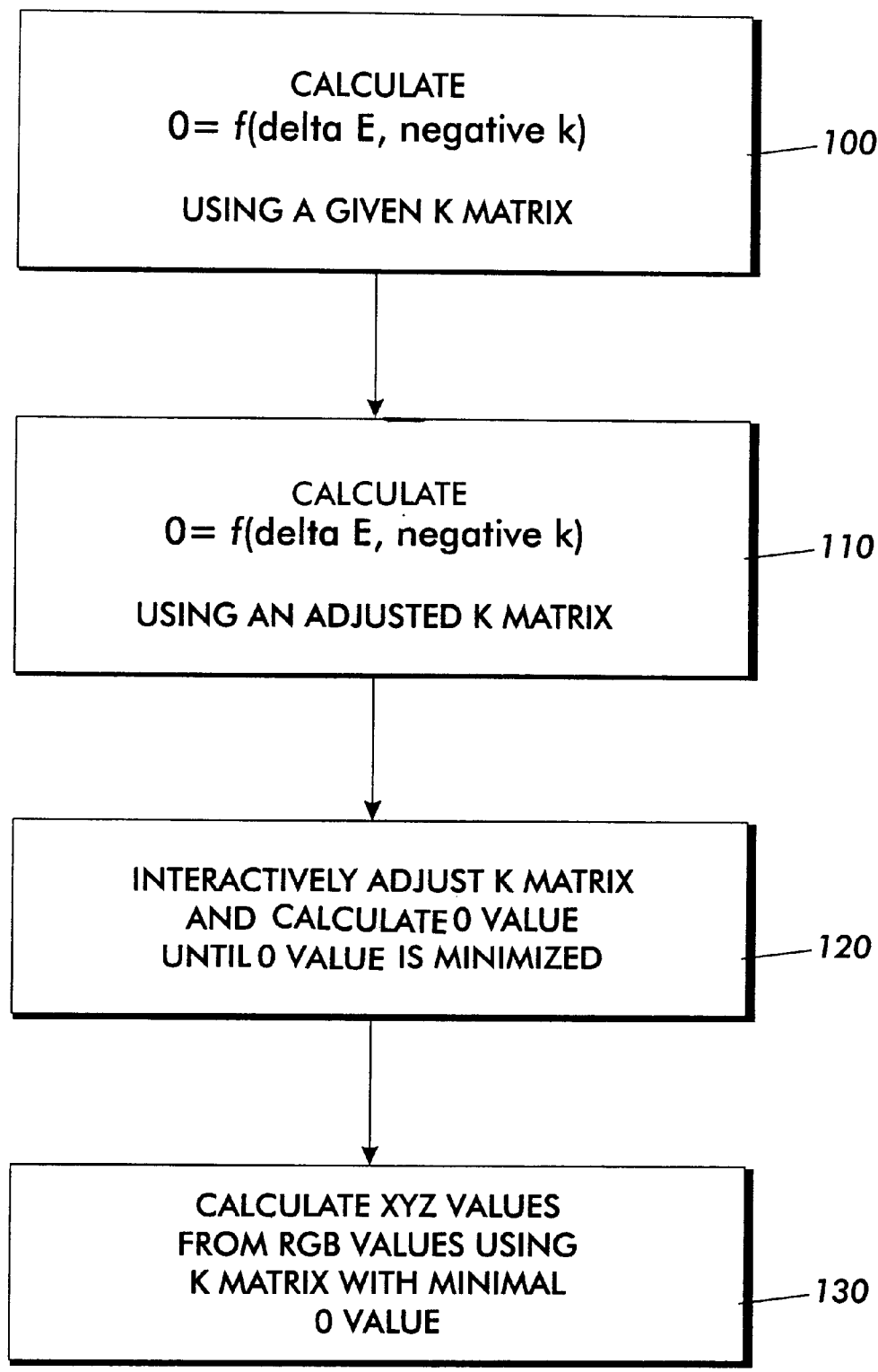
FIG. 3 is a flowchart illustrating a technique for optimizing the coefficient matrix to cause the coefficients to be all positive.

FIG. 3 illustrates a technique in accordance with the invention for optimizing the coefficient matrix K to cause the coefficients $k_n$ to be all positive. In the inventive optimization technique, the optimization value is calculated as a function of two components: a first component (deltaE) that considers the error between the $i^{th}$ training color as seen visually and the corresponding color as determined by the scanner; and a second component (negative k) that takes the sign of the coefficients into account.

As illustrated in step 100 of FIG. 3, for a given K matrix, the optimization value O is calculated as a function of the two components, deltaE and negative k. In step 110, the coefficients of the K matrix are then adjusted and the optimization value O for the adjusted K matrix is recalculated, again as a function of the two components deltaE and negative K. Using known interative feedback techniques, the $k_n$ coefficients are interatively adjusted in step 120 to find the K matrix having a minimal optimization value O. The K matrix with the minimal optimization value O may be used in step 130 to calculate the XYZ values from the RGB values. The steps 100, 110 and 120 of FIG. 3 can be performed iteratively by a computer program within the optimization section 95. Preferably, all the coefficients $k_n$ in the K matrix having the minimal optimization value will have a value greater than or equal to zero. However, this is not strictly necessary as long as any negative coefficients are sufficiently small. The optimization value O should take into account the sign of the coefficients, but the transformation matrix having the minimal optimization value need not have all positive coefficients if any negative coefficients are sufficiently small.

In a preferred embodiment, the calculation of the optimization value in steps 100, 110 and 120 of FIG. 3 uses a weighted sum of the mean and maximum color error over a set of training colors as the first component (deltaE), combined with a term whose size is proportional to the number of coefficients less than zero as the second component (negative K). This can be implemented as follows in a preferred embodiment:

$$O = a*\text{Sum}_{i=1 \text{ to } N}(\text{delta}E_i)/N + b*\text{Max}_{i=1 \text{ to } N}(\text{delta}E_i) + c*\text{Sum}_{j=1, \text{ to } J}[1-\text{step}(k_j)] \quad \text{Eq. 5}$$

Where:
(1) deltaE$_i$ is the error between the $i^{th}$ training color as visually seen and the corresponding color as determined by the scanner;
(2) N is the number of colors in the training set;
(3) J is the number of coefficients in the matrix K;
(4) a, b and c are weighting coefficients (which are generally positive); and
(5) step ($k_j$) has a value of zero when the coefficient $k_j$ has a negative value, and has a value of 1 when the coefficient $k_j$ has a positive value.

Those skilled in the art will recognize that: the exact definition of deltaE is not important but could be the CIELAB color difference; and changing the weights a, b and c varies the pressure of those terms in the minimization. In addition, those skilled in the art will recognize that the value of J will depend on the number of color signals output by the scanner. For the three color signals RGB described herein, the value J will be 9, representing 9 coefficients within the matrix K. Further, those skilled in the art will also recognize that both the mean and maximum color errors need not be used—the mean or the maximum error could be used, or any other component which represents color error.

The preferred embodiment described in Equation 5 accounts for negative coefficients using a term whose size is proportional to the number of coefficients less than zero. However, it is within the scope of the invention that other terms could be used in the optimization that take into account the sign of the coefficients. For example, instead of using a term whose size is proportional to the number of coefficients less than zero, it is possible to use a term whose size is proportional to the magnitude of the negative coefficient. For example, the number of negative coefficients may be relatively small, but their magnitude may be relatively large. In this case, the optimization value could be expressed as:

$$O=a*\text{Sum}_{i=1 \text{ to } N}(\text{delta}E_i)/N+b*\text{Maxi}_{i=1 \text{ to } N}(\text{delta}E_i)-c*\Sigma_{j=1 \text{ to } j}[1-\text{step}(k_j)]k_j \quad \text{Eq. 6}$$

In Equation 6, the optimization value O decreases as the magnitude of the negative coefficients $k_n$ decreases.

In accordance with the invention, the optimization procedure seeks to minimize O by adjusting the values of K. In general, the added constraint on K (i.e., all positive coefficients) will lead to larger residual color errors. However, in some cases, solutions may be found that minimize the errors without significantly affecting the XYZ values.

As used herein, the terms "optimize" and "optimization" have been used to connote a condition where the optimization value for one K matrix is deemed better than the optimization value for another K matrix because the difference between the two matrices is less than a desired difference. One skilled in the art recognizes that it may be possible to determine a better K matrix. However, the difference may not be significant because there would be no practical advantage in further optimization. Similarly, the terms "minimize" and "minimal" have been used to connote a condition where one optimization value O is deemed less than another optimization value O because the difference between the two optimization values is greater than a desired difference. Again, one skilled in the art would recognize that it may be possible to determine a lesser optimization value O. However, the difference may not be significant because there would be no practical advantage in further optimization. Accordingly, the foregoing terms are not intended to describe an ultimate or absolute condition. Rather, as recognized by one skilled in the art, the terms are intended to describe a condition that is relative to a desired level of accuracy represented by the magnitude of the desired difference between the two optimization values O.

While this invention has been described in conjunction with specific embodiments outlined above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined herein.

What is claimed is:

1. A method for modifying the color characteristics of a color image in an image forming device, comprising:
   generating device dependent signals representative of the color of the image;
   determining a color transformation matrix for transforming device dependent color imaging signals into device independent color imaging signals, the transformation matrix including a set of coefficients, by:
   calculating an optimization value for the transformation matrix as a function of the coefficients within the transformation matrix having a value less than zero;
   adjusting the values of the coefficients within the transformation matrix; and
   determining a minimal optimization value for the transformation matrix; and
   using the device independent color signals to form an image.

2. The method of claim 1, wherein the transformation matrix having the minimal optimization value has coefficients with values greater than or equal to zero.

3. The method of claim 1, further comprising the step of calculating the device independent color imaging signals from the device dependent color imaging signals using the transformation matrix associated with the minimal optimization value.

4. A method for modifying the color characteristics of a color image in an image forming device, comprising:
   determining a color transformation matrix for transforming device dependent color imaging signals into device independent color imaging signals, the transformation matrix including a set of coefficients, by:
   calculating an optimization value for the transformation matrix as a function of first and second components, the first component representing a color error between known device independent color signals and calculated device independent color signals that are determined by using the transformation matrix, and the second component representing negative values of the coefficients within the transformation matrix;
   adjusting the values of the coefficients within the transformation matrix; and
   determining a minimal optimization value for the transformation matrix; and
   using the device independent color signals to form an image.

5. The method of claim 4, wherein the transformation matrix having the minimal optimization value has coefficients with positive values.

6. The method of claim 4 wherein the second component of the optimization value is a term whose size is proportional to a number of negative coefficients.

7. The method of claim 4 wherein the second component of the optimization value is a term whose size is proportional to a cumulative magnitude of the negative coefficients.

8. The method of claim 4, wherein the first component is at least one of a mean color error and a maximum color error.

9. The method of claim 4, further comprising the step of calculating the device independent color imaging signals from the device dependent color imaging signals using the transformation matrix associated with the minimal optimization value.

10. An image forming device for modifying the color characteristics of a color image, comprising:
    an image input device for generating device dependent signals representative of the color of the image;
    a data processor for
    (1) determining a color transformation matrix for transforming device dependent color imaging signals into device independent color imaging signals, the transformation matrix including a set of coefficients, by:
    (2) calculating an optimization value for the transformation matrix as a function of the coefficients within the transformation matrix having a value less than zero;
    (3) adjusting the values of the coefficients within the transformation matrix;
    (4) determining a minimal optimization value for the transformation matrix; and
    a controller for using the device independent color signals to form an image.

11. The device of claim 10, wherein the transformation matrix having the minimal optimization value has coefficients with values greater than or equal to zero.

12. The apparatus of claim 10, wherein the controller further calculates the device independent color imaging signals from the device dependent color imaging signals using the transformation matrix associated with the minimal optimization value.

13. An image forming device for modifying the color characteristics of a color image, comprising:

an image input device for generating device dependent signals representative of the color of the image; and a data processor for (1) determining a color transformation matrix for transforming device dependent color imaging signals into device independent color imaging signals, the transformation matrix including a set of coefficients, the controller comprising:

(2) calculating an optimization value for the transformation matrix as a function of first and second components, the first component representing a color error between known device independent color signals and calculated device independent color signals that are determined by using the transformation matrix, and the second component representing negative values of the coefficients within the transformation matrix;

(3) adjusting the values of the coefficients within the transformation matrix;

(4) determining a minimal optimization value for the transformation matrix; and a controller for using the transformed color image signals to form an image.

14. The device of claim 13, wherein the transformation matrix having the minimal optimization value has coefficients with positive values.

15. The device of claim 14 wherein the second component of the optimization value is a term whose size is proportional to a number of negative coefficients.

16. The device of claims 14 wherein the second component of the optimization value is a term whose size is proportional to a cumulative magnitude of the negative coefficients.

17. The device of claim 14, wherein the first component is at least one of a mean color error and a maximum color error.

18. The device of claim 14, wherein the data processor calculates the device independent color imaging signals from the device dependent color imaging signals using the transformation matrix associated with the minimal optimization value.

* * * * *